Sept. 23, 1930.     D. E. GRAY ET AL     1,776,556
METHOD OF AND APPARATUS FOR DISCHARGING ARTICLES
Filed May 26, 1928     2 Sheets-Sheet 1

INVENTORS
DAVID E. GRAY &
BY GEORGE CRITES
ATTORNEYS

Sept. 23, 1930.  D. E. GRAY ET AL  1,776,556
METHOD OF AND APPARATUS FOR DISCHARGING ARTICLES
Filed May 26, 1928  2 Sheets-Sheet 2

INVENTORS
DAVID E. GRAY &
BY GEORGE R. CRITES.
ATTORNEYS.

Patented Sept. 23, 1930

1,776,556

UNITED STATES PATENT OFFICE

DAVID E. GRAY, OF CORNING, NEW YORK, AND GEORGE R. CRITES, OF WELLSBORO, PENNSYLVANIA, ASSIGNORS TO CORNING GLASS WORKS, OF CORNING, NEW YORK, A CORPORATION OF NEW YORK

METHOD OF AND APPARATUS FOR DISCHARGING ARTICLES

Application filed May 26, 1928. Serial No. 280,907.

This invention relates to discharging articles from a travelling carrier and more particularly to the ejecting of hot glass articles from the supporting carrier of a glass working machine such as is shown and described in British Patent 276,606, dated September 1, 1927.

The removal of finished articles from the travelling ribbon carrier of this machine is effected by interposing a crack off bar in the path of travel of the articles. While such a device has proven effective, difficulty is frequently experienced due to the tendency of some of the articles to cling to the carrier thus increasing the latitude of the discharge area and causing congestion, chipping and breakage. Moreover the separation of the articles from the carrier sometimes produces fine glass splinters which are apt to fall into them. While such a condition may seem to be of little moment, when it is remembered that the articles when discharged are still hot, so that the particles which fall into them are quite likely to adhere, the importance of preventing the introduction of foreign matter into the articles becomes evident.

An object of the present invention is to avoid the congestion of articles at their point of discharge from a travelling carrier.

Another object is to prevent chipping the articles and the introduction of foreign matter into them during their discharge.

A further object is to produce a clean surface on the articles at their points of separation from the carrier.

The above and other objects may be attained by the use of this invention which includes among its features a vibrating ejector, arranged to exert both lateral and axial force upon the articles, said ejector being synchronized with the carrier so that as the articles are successively presented to it, they receive a sharp blow causing their rapid, accurate and orderly propulsion away from the carrier.

Figure 1:
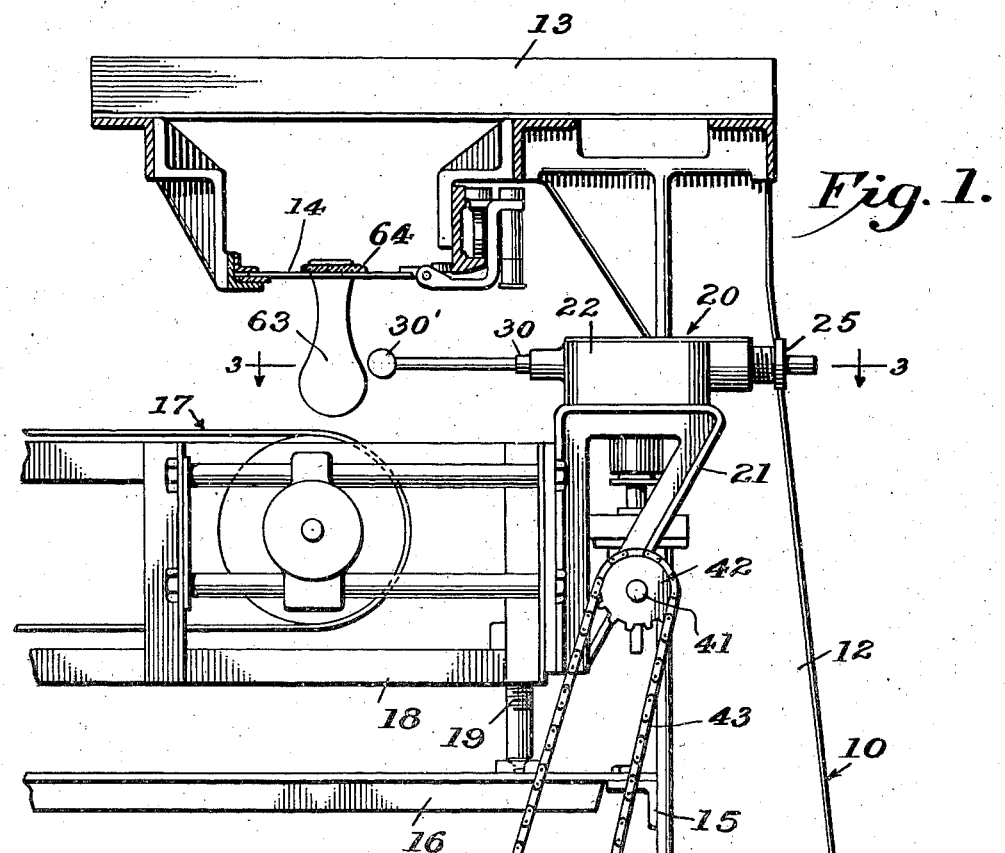
Fig. 1 is a side view in elevation of an ejector constructed in accordance with this invention, showing its relation to a travelling article carrier and an article receiving conveyor.

Referring to the drawings in detail, a bulb blowing machine designated generally 10, includes a bed 11 to which standards 12 are secured. These standards support, at their upper ends, a super-structure 13 in which a travelling article carrier 14 is mounted. A main drive shaft 15 extends longitudinally of the machine near the lower ends of the standards 12 and serves to transmit power to the article carrier and other moving parts of the machine, the manner of driving them not being illustrated as it forms no part of this invention. Secured intermediate the upper and lower ends of the standards 12 is a longitudinally extending rail 15 which forms a support for the inner ends of transversely disposed angle irons 16, the opposite ends of the latter being supported in any suitable manner (not shown).

A receiving conveyor designated generally 17 is provided and includes a frame 18, one end of which is supported for vertical adjustment on screws 19, the lower ends of which rest upon the angle irons 16. It will thus be seen that the relative position of the conveyor and carrier 14 may be readily altered.

In its present aspect the invention embodies an ejector designated generally 20 including a pair of brackets 21, which are adjustably secured to the inner end of the frame 18. A housing 22 is supported by the brackets and is provided at opposite points with openings 23 and 24, the latter being formed with internal screw threads for the reception of a threaded bushing 25, whose bore aligns with the opening 23. Formed in parallel relation to the openings 23 and 24 are large and small openings 26 and 27 respectively and the latter is provided with internal screw threads for the reception of the threaded end of a guide bar 28. The end of the guide bar opposite the threaded end is formed with a cylindrical stop 29 which slidably fits the opening 26.

Mounted for reciprocal motion in the opening 23 and the bore of the bushing 25 is a carriage 30 carrying a striker 30'. A collar 31 is secured to the carriage and extending laterally therefrom is an arm 32 formed with a sleeve 33 which slides upon the guide bar 28. Surrounding the carriage between the inner end of the bushing 25 and the collar 31 is a compression coiled spring 34 which normally urges the carriage forwardly toward the conveyor 17, the forward movement of the carriage being limited by the engagement of the sleeve 33 with the stop 29. A roller 35 depends from the under side of the collar 31 for engagement with an actuating cam 36 by which the carriage is moved against the tension of the spring.

Figure 2:
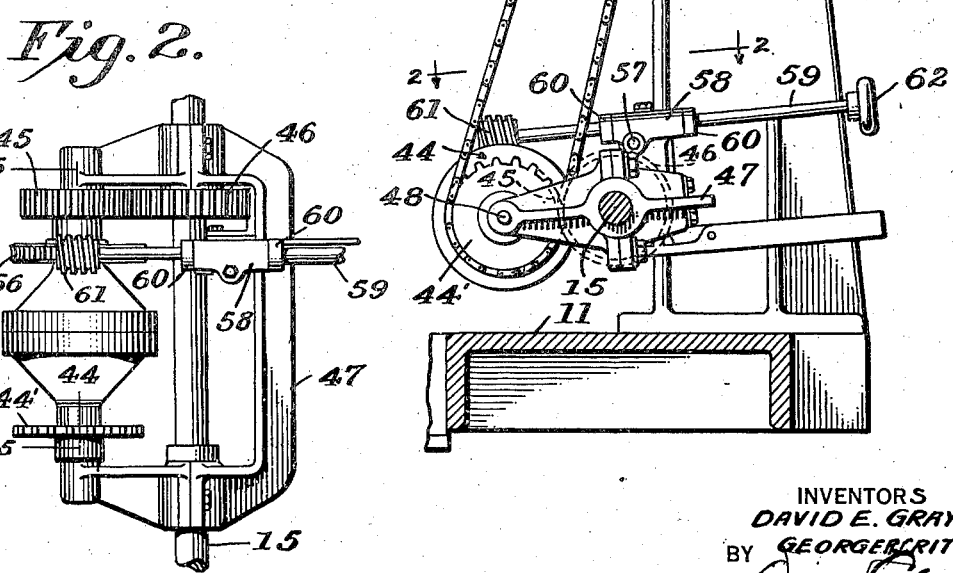
Fig. 2 is a horizontal sectional view taken on the line 2—2 of Fig. 1.
Figure 3:
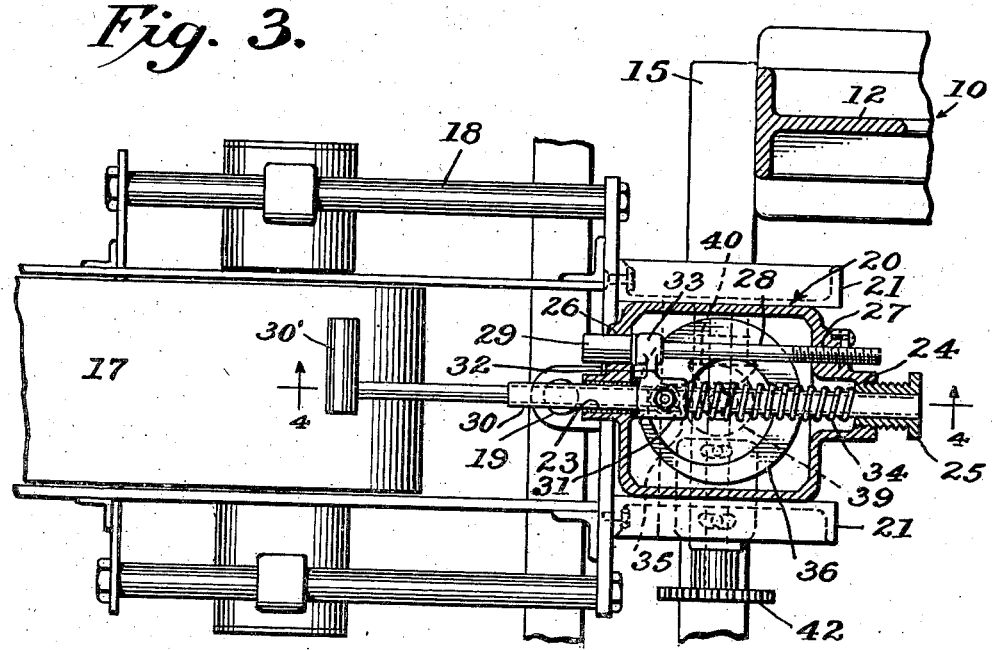
Fig. 3 is an enlarged horizontal sectional view taken on the line 3—3 of Fig. 1.
Figure 4:
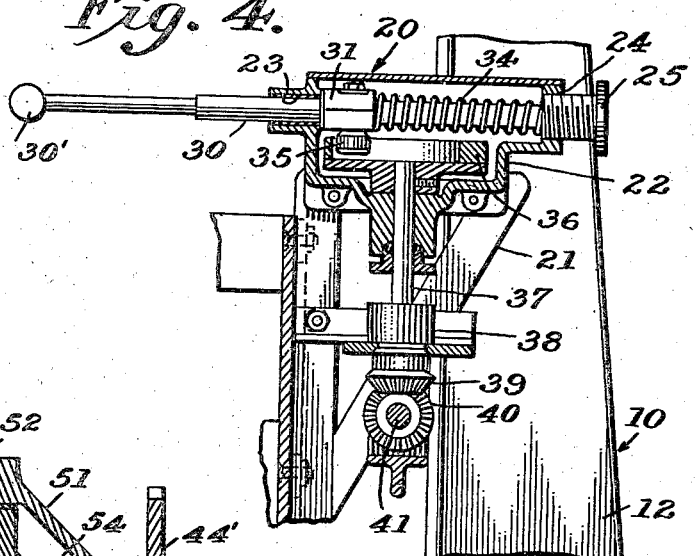
Fig. 4 is a vertical sectional view taken on the line 4—4 of Fig. 3.
Figure 5:
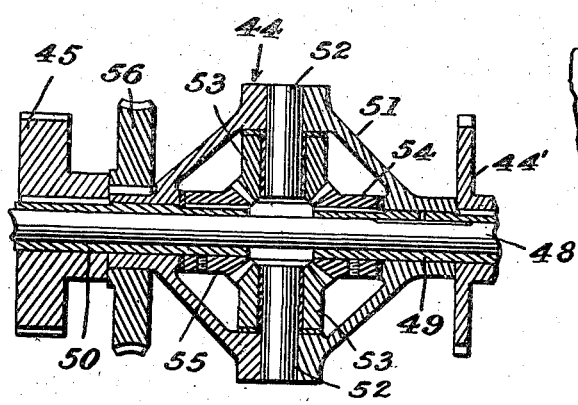
Fig. 5 is a sectional view taken on the line 5—5 of Fig. 2.

The cam 36 is secured to the upper end of a vertically extending shaft 37 which is mounted for rotation in the housing 22 and in a bearing 38 which is secured between the brackets 21. A bevelled pinion 39 is secured to the lower end of the shaft 37 and meshes with a bevelled pinion 40 which is secured to one end of a horizontally disposed shaft 41. The latter is provided at its end opposite that carrying the bevelled pinion 40 with a sprocket 42 which is connected by a chain 43 to a drive mechanism designated generally 44 (Figs. 1, 2 and 5).

Mounted for oscillating movement about the drive shaft 15 (Figs. 1 and 2) is a yoke 47 in which a fixed shaft 48 (Figs. 1 and 5) is secured. Independently rotatable sleeves 49 and 50 (Fig. 5), to which the sprocket 44' and gear 45 respectively, are keyed, surround the shaft 48 and mounted for rotation about the sleeves is a housing 51 which is provided with radially disposed stub shafts 52 carrying bevel pinions 53. These bevel pinions mesh with bevel pinions 54 and 55 which are respectively secured to the inner ends of the sleeves 49 and 50 and it will thus be seen that when the housing 51 is held stationary and gear 45 driven, power will be transmitted through the sleeves 50, pinions 55, 53 and 54 to the sleeve 49, thus rotating the sprocket 44'.

In order that the housing may be held stationary, and relative adjustment may be made between the sprocket 44' and gear 45, the following mechanism is employed. A worm gear 56 is keyed to the housing, and pivotally mounted at 57 (Fig. 1), to the yoke 47, is a bearing 58 in which a shaft 59 is rotatably mounted. Longitudinal movement of the shaft through the bearing is prevented by suitable thrust collars 60 and secured to one end of the shaft is a worm 61, while a hand wheel 62 is carried at its opposite end. When the hand wheel 62 is moved upwardly the worm 61 meshes with the worm gear 56 thereby arresting rotation of the latter and holding the housing 51 stationary. This causes the gear 45 to drive sprocket 44'. By turning the hand wheel 62, it will be seen that the worm gear and housing will be rotated about the shaft 48 and sleeves 49 and 50 so as to advance or retard the position of gear 45 with relation to the sprocket 44'. Thus proper synchronism is effected between carrier 14 and the ejecting mechanism. By downward movement of the hand wheel, the worm 61 disengages the worm gear 56, thus permitting the housing 51 to rotate harmlessly about its axis and allowing the sprocket 44' to remain stationary.

The operation is as follows: With the glass working machine 10 in operation the shaft 15 rotates, and the carrier 14 successively presents articles, such as bulbs 63, to the receiving conveyor 17. With the worm 61 in mesh with the worm gear 56, rotation will be imparted to the cam 36 through the medium of the drive mechanism 44, the chain 43, shaft 41 and bevel pinions 40 and 39. This causes the carriage 30 to be retracted against the tension of the spring 34 until the high point of the cam passes the roller 35 at which time the carriage is forcibly projected forwardly under the influence of the spring 34. Such movement of the carriage is limited by the stop 29, and by adjusting the guide bar 28 it will be seen that the length of stroke of the carriage may be varied to suit different conditions. By turning the hand wheel 62 the timing of the movements of the carriage may be altered so as to insure proper contact of the striker 30' with the article 63. In order to cause the striker to exert longitudinal as well as lateral force upon the article, its position above the conveyor 17 may be adjusted by raising or lowering the brackets 21 until its point of contact is slightly above the horizontal axis of the enlarged portion of the article. The sharp blow received by the article not only accurately directs it onto the conveyor 17 but also severs it from the ribbon 64 and prevents chips and splinters which may be caused by the separation from entering it.

While in the foregoing there has been shown and described a preferred embodiment of this invention, it is to be understood that minor changes in the details of construction, combination and arrangement of parts may be resorted to without departing from the scope of the claims.

We claim:

1. The method of severing glass articles from a glass ribbon which includes supporting the ribbon on a travelling carrier and striking the articles to separate them from said ribbon transversely of the direction in which it is travelling.

2. The method of severing glass articles from a glass ribbon which includes supporting the ribbon on a travelling carrier and striking the articles to separate them from the ribbon in planes at right angles to the direction in which it is travelling.

3. The method of severing glass bulbs from a glass ribbon which includes supporting the ribbon on a travelling carrier and separating the bulbs from the ribbon by striking each bulb at a point where longitudinal as well as lateral force will be exerted upon it.

4. The method of severing glass articles from a glass ribbon which includes supporting the ribbon on a travelling carrier and separating the articles from the ribbon by striking them a blow transversely of the direction in which the carrier travels.

5. The combination with a travelling carrier supporting a glass ribbon from which articles are suspended, of a vibrating ejector arranged to sever the articles from the ribbon.

6. The combination with a travelling carrier supporting a glass ribbon from which articles are suspended, of a vibrating ejector arranged to sever the articles from the ribbon and discharge them transversely of the direction of travel of the carrier.

7. The combination with a travelling carrier supporting a glass ribbon from which articles are suspended, of a vibrating ejector arranged to sever the articles from the ribbon and means to regulate the movements of the ejector relative to the ribbon.

8. The combination with a travelling carrier supporting a glass ribbon from which articles are suspended, of a vibrating ejector arranged to sever the articles from the ribbon and eject them transversely of the direction of travel of the carrier, and means to regulate the movements of the ejector relative to the carrier.

9. The combination with an article receiving conveyor and a travelling carrier supporting a glass ribbon from which articles are suspended, said carrier successively presenting the articles to said conveyor, of vibrating means for severing the articles from the ribbon and ejecting them as they are presented to the conveyor.

10. The combination with an article receiving conveyor and a travelling carrier supporting a glass ribbon from which articles are suspended, said carrier successively presenting the articles to said conveyor, of vibrating means for severing the articles from the ribbon as they are presented to the conveyor and means to regulate the movements of the vibrating means.

11. The combination with an article receiving conveyor and a travelling carrier supporting a glass ribbon from which articles are suspended, said carrier successively presenting the articles to the conveyor, of vibrating means for severing the articles from the ribbon and ejecting them transversely of the direction of movement of the article carrier as they are presented by it to the receiving conveyor.

12. The combination with an article receiving conveyor and a travelling carrier supporting a glass ribbon from which articles are suspended, said carrier successively presenting the articles to the conveyor, of vibrating means for severing the articles from the ribbon and ejecting them transversely of the direction of movement of the article carrier as they are presented by it to the receiving conveyor, and means to regulate the movements of the vibrating means.

13. The combination with an article receiving conveyor, and a travelling carrier supporting a glass ribbon from which articles are suspended, said carrier successively presenting the articles to the conveyor, of a reciprocating striker for severing the articles from the ribbon and ejecting them as they are presented to the conveyor.

14. The combination with an article receiving conveyor and a travelling carrier supporting a glass ribbon from which articles are suspended, said carrier successively presenting the articles to the conveyor, of a reciprocating striker for severing the articles from the ribbon and ejecting them as they are presented to the conveyor, and means connected with the carrier for actuating the striker.

15. The combination with an article receiving conveyor and a travelling carrier supporting a glass ribbon from which articles are suspended, said carrier successively presenting the articles to the conveyor, of a reciprocating striker for severing the articles from the ribbon, means connected with the carrier for actuating the striker, and means for synchronizing the operation of the striker with the presentation of the articles by the carrier.

DAVID E. GRAY.
GEO. R. CRITES.